United States Patent
Nagashima et al.

[11] Patent Number: 6,140,455
[45] Date of Patent: Oct. 31, 2000

[54] LIQUID CRYSTALLINE POLYESTER RESIN FOR EXTRUSION MOLDING

[75] Inventors: Tohru Nagashima; Koichi Mizumoto; Manabu Hirakawa, all of Tsukuba, Japan

[73] Assignee: Sumitomo Chemical Company, Limited, Osaka, Japan

[21] Appl. No.: 09/437,600

[22] Filed: Nov. 10, 1999

[30] Foreign Application Priority Data

Nov. 12, 1998 [JP] Japan ................................. 10-321620
Jan. 25, 1999 [JP] Japan ................................. 11-015379

[51] Int. Cl.[7] .................................................. C08G 63/00
[52] U.S. Cl. .......................... 528/190; 528/176; 528/193; 528/194; 528/206; 528/212; 528/219; 428/221; 428/357
[58] Field of Search .................................. 528/176, 190, 528/193, 194, 206, 212, 219; 428/221, 357

[56] References Cited

U.S. PATENT DOCUMENTS 5,085,807  2/1992  Okamoto et al. ....................... 252/609
5,767,195  6/1998  Furuta et al. ............................. 525/68
5,891,532  4/1999  Furuta et al. ............................. 428/1
5,997,765  12/1999 Furuta et al. ...................... 252/299.01

FOREIGN PATENT DOCUMENTS 0790279    8/1997   European Pat. Off. .
61-078862  4/1986   Japan .
63-270760  11/1988  Japan .
2-003430   1/1990   Japan .
5-186614   7/1993   Japan .

*Primary Examiner*—Samuel A. Acquah
*Attorney, Agent, or Firm*—Birch, Stewart, Kolasch & Birch

[57] ABSTRACT

Provided is a liquid crystalline polyester resin for extrusion molding having a solder heat resistant temperature of 250° C. or more, wherein the ratio ((viscosity 2b)/(viscosity 1b)) of the melt viscosity (viscosity 1b) under a shearing speed of 1000/sec at the flow initiation temperature and the melt viscosity (viscosity 2b) under the same shearing speed at a temperature 20° C. higher than the flow initiation temperature is from 0.10 to 0.70. The extrusion molding material of the above-described liquid crystalline polyester resin has excellent heat resistance, and can provide an extrusion molded article, especially a film having excellent appearance.

7 Claims, No Drawings

LIQUID CRYSTALLINE POLYESTER RESIN FOR EXTRUSION MOLDING

BACKGROUND OF THE INVENTION

1. Field of the Invention

The present invention relates to a liquid crystalline polyester resin for extrusion molding having high heat resistance and an excellent extrusion molding property.

2. Description of the Related Art

Liquid crystalline polyester resins (hereinafter, sometimes referred to as liquid crystalline polymer) have the features that their heat resistance is high, their flowability in molten state is excellent and the like, and therefore, are used in wide variety of fields mainly including the electronic material field as injection molding materials which can be precisely molded. They are called collectively as liquid crystalline polymers, however, generally classified into type I, type II and type III based on level of heat resistance thereof (e.g., "Liquid Polymer for Molding Design", Sigma Shuppan (1995)). Of them, those called type I are composed of specific wholly aromatic components, and are materials having especially high heat resistance, that is, a deflection temperature under load of 250° C. or more, among liquid crystalline polymers.

In addition to excellent heat resistance of liquid crystalline polymers, applications to extrusion molding fields such as films, vessels and the like have been intensively studied by utilizing features such as an excellent gas barrier property, low dielectric property, chemical resistance and the like.

However, it is generally said that liquid crystalline polymers are materials not suitable for extrusion molding field since their melt viscosity is low, and therefore, the anisotropy thereof is high and the like.

Therefore, a lot of investigations have been made. For example, Japanese Patent Application Laid-Open (JP-A) No. 2-3430 discloses film-formation of an aromatic polymer comprising (1) oxybenzoic acid and (2) 2,6-naphthoic acid as repeating units. JP-A No. 5-186614 discloses the film-formation of semi-aromatic materials prepared by adding components such as ethylene glycol and the like in addition to the above-described oxybenzoic acid and 2,6-naphthoic acid. Also, combination with other resins has been studied for the purpose of improving the extrusion molding property thereof. For example, JP-A No. 61-78862 discloses a composition composed of a liquid crystalline polymer and polyethylene terephthalate, and JP-A No. 63-270760 discloses film-formation of a composition composed of a liquid crystalline polyester and an aromatic polycarbonate. However, in any of them, liquid crystalline polymers are of type II and type III, heat resistance is low, or, a material having low heat resistance is combined for improvement of processability in a liquid crystalline polymer comprising a type I liquid crystalline polymer. Therefore, in the present conditions, sufficient heat resistance originally owned by a type I liquid crystalline polymer has not been obtained yet.

SUMMARY OF THE INVENTION

An object of the present invention is to provide a liquid crystalline polyester resin for extrusion molding which has high heat resistance, suitable flowability and processability, and gives an extrusion molded article having excellent appearance, an extrusion molding material and an extrusion molded article using it.

The present inventors have studied film-forming and blow-molding using a resin solely composed of a liquid crystalline polyester from the standpoint of heat resistance, and as a result found that excellent extrusion molding is possible by satisfying certain conditions regarding polymer physical properties and melt flowability, even when the liquid crystalline polyester has a heat resistance of nearly equivalent to that of a type I polymer.

Namely, according to the present invention, there is provided a liquid crystalline polyester resin for extrusion molding having a solder heat resistant temperature of 250° C. or more, wherein the ratio ((viscosity 2b)/(viscosity 1b)) of the melt viscosity (viscosity 1b) under a shearing speed of 1000/sec at the flow beginning temperature and the melt viscosity (viscosity 2b) under the same shearing speed at a temperature 20° C. higher than the flow beginning temperature is from 0.10 to 0.70.

Also, the present invention provides an extrusion molding material comprising a resin component wherein this resin component is composed of the above-described liquid crystalline polyester resin for extrusion molding.

Further, the present invention provides an extrusion molded article obtained by extrusion-molding the above-described extrusion molding material.

DETAILED DESCRIPTION OF THE INVENTION

The present invention will be illustrated in detail below.

The liquid crystalline polyester resin for extrusion molding of the present invention has a solder heat resistant temperature of 250° C. or more, and is a resin for extrusion molding revealing specific melt flowability.

The solder heat resistant temperature herein referred to is measured as follows. A molded article of a JIS 1 (1/2) dumbbell having a thickness of 1.2 mm is used as a specimen, and this specimen is immersed into a solder bath composed of 60% of tin and 40% of lead at 240° C., kept at this temperature for 60 seconds, then, taken out of the bath, and the appearance is observed. Subsequently, the temperature of this solder bath is raised step-wise each by 10° C. and the same examination was repeated at each temperature, and the maximum temperature wherein the specimen does not generate blister or is not deformed is called solder heat resistant temperature. When the solder heat resistant temperature is lower than 250° C., various restrictions occur regarding use in a solder reflow furnace, and main aspect of the purpose of the present invention is not obtained.

The specific melt flowability described above means melt flowability wherein the ratio ((viscosity 2b)/(viscosity 1b)) of the melt viscosity (viscosity 1b) under a shearing speed of 1000/sec at the flow beginning temperature and the melt viscosity (viscosity 2b) under the same shearing speed at a temperature 20° C. higher than the flow beginning temperature is from 0.10 to 0.70, preferably from 0.12 to 0.50.

The flow beginning temperature referred to in the present invention means a temperature wherein anisotropic melt phase begins to appear, and when a resin heated at a temperature rising speed of 4° C./min is extruded through a nozzle having an internal diameter of 1 mm and a length of 10 mm under a load of 100 kgf/cm$^2$, the melt viscosity reveals 48000 poise.

When the melt viscosity ratio is out of the above-described range, extrusion molding processability is difficult, the resulted molded article has strong anisotropy and there is a fear that it can not be applied to practical use.

The resin of the present invention preferably has a melt tension measured at a temperature 30° C. higher than the flow beginning temperature of 10 g or more.

The melt tension herein referred to means a temperature measured as follows. A resin is melted in a dice having a length of 8.0 mm and a diameter φ of 2.1 mm set at a temperature 30° C. higher than the flow beginning temperature of the resin, this is extruded at a piston speed of 2 mm/min, passed through a tension pulley, then, drawn in the form of mono-filament by a drawing roller, and a force applied to the tension pulley on breaking of the filament when the drawing speed is raised gradually is called melt tension. When the melt tension is less than 10 g, the elongation in film-forming by extrusion-molding is insufficient, and particularly, processing in conducting film-molding and blow-molding tends to become difficult undesirably. The upper limit of the melt tension is not especially limited, but it is preferably 40 g or less in view of processablity.

The resin of the present invention preferably contains a combination of two or more of an aromatic hydroxycarboxylic acid unit, an aromatic dicarboxylic acid unit and an aromatic dihydroxy unit. As the aromatic hydroxycarboxylic acid unit, the following structures and the like can be exemplified.

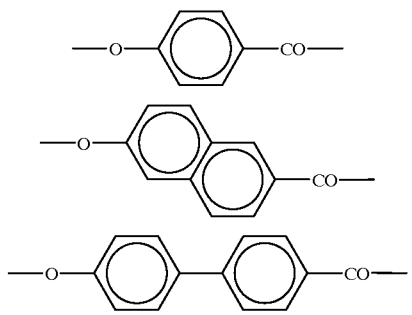

As the aromatic dihydroxy acid unit, the following structures and the like can be exemplified.

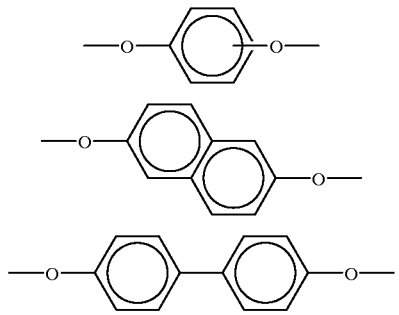

As the aromatic dicarboxylic acid unit, the following structures and the like can be exemplified.

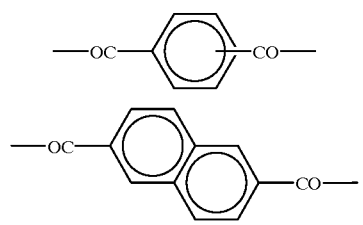

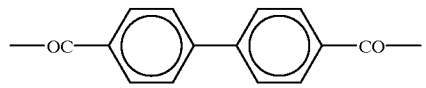

Combinations and compositional rations of the above-described constitutional units are not restricted, however, as preferable combinations for obtaining high heat resistance and suitable flowability intended in the present invention, liquid crystalline polyester resins wherein the resin comprises two or more of constituent units represented by the formulae (1) to (4) and the total amount of these combined constituent units is 97 mol % or more based on the whole amount are desirable.

(1)

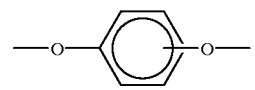

(2)

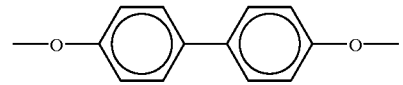

(3)

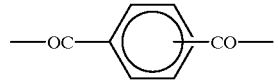

(4)

As the preferable resin of the present invention, there are further listed liquid crystalline polyester resins wherein the resin has specific constituent units satisfying all of the following conditions (a) to (c):

(a): the proportion of the constituent unit represented by the formula (1) is from 40 to 70 mol % based on the whole amount, (b) the total amount of the constituent unit represented by the formula (2) and the constituent unit represented by the formula (3) is from 15 to 30 mol % based on the whole amount, and the proportion of the constituent unit represented by the formula (2) is from 0 to 95 mol % based on the total amount of the constituent unit represented by the formula (2) and the constituent unit represented by the formula (3), and 80 to 100 mol % of the constituent unit represented by the formula (2) is composed of constituent components in which the main chain is situated at para-position, and (c) the proportion of the constituent unit represented by the formula (4) is substantially equivalent to the proportion of the total amount of the constituent unit represented by the formula (2) and the constituent unit represented by the formula (3), and 50 mol % or more of the constituent unit represented by the formula (4) is composed of constituent components in which the main chain is situated at para-position.

The resin of the present invention desirably has an intrinsic viscosity [η] of 5.5 or more. When the intrinsic viscosity [η] is less than 5.5, it is difficult to obtain the above-described melt viscosity property and melt tension.

The method for producing the resin of the present invention is not particularly restricted, and known methods can be used. For example, it is obtained by a method in which a mixture composed of the above-described combination of two or more of an aromatic hydroxycarboxylic acid unit, an aromatic dicarboxylic acid unit and an aromatic dihydroxy unit is subjected to a polycondensation reaction in a polymerization vessel, and the like. As the monomer compound having an aromatic hydroxycarboxylic acid unit, hydroxybenzoic acid, p-acetoxybenzoic acid and the like are listed, and as the monomer compound having an aromatic dicarboxylic acid unit, terephthalic acid, isophthalic acid and the like are listed, and as the monomer compound having an aromatic dihydroxy unit, 4,4'-dihydroxydiphenyl, 4,4'-diacetoxydiphenyl, hydroquinone, resorcinol and the like are listed. The charging of these compounds may be conducted under lump-sum mode or divided mode. The reaction can be conducted under inert gas, for example, nitrogen atmosphere at normal pressure, reduced pressure, or combination thereof. The process can be conducted by a batchwise method, continuous method, or combination thereof.

Further, it is also possible that a reaction for converting the above-described monomer compound to a compound which is easily polymerized (for example, esterification reaction) is conducted prior to a polycondensation reaction, then, the polycondensation reaction is subsequently carried out.

The temperature for the above-described polycondensation reaction is preferably from 270 to 380° C. When this temperature is less than 270° C., progress of the polymerization reaction is slow, and when over 380° C., side-reactions such as decomposition and the like tend to occur. Multi-stage reaction temperatures may be adopted, and depending on occasions, a reaction product, polymer can be extracted in molten state for recovery during temperature rising process or immediately after the temperature reaches the maximum temperature. For further increasing the molecular weight of the extracted polymer, post treatment such as solid phase polymerization and the like can be conducted by heating under inert gas atmosphere.

The extrusion molding material of the present invention comprises a resin component, and this resin is substantially composed of the above-described liquid crystalline polyester resin for extrusion molding of the present invention.

In the present invention, the liquid crystalline polyester resin obtained as described above can be applied to an extrusion molding machine in the form of a powder intact as an extrusion molding material, however, it is preferable from the standpoint of handling that it is first made into pellets by a granulator, and this is put into an extrusion molding machine as an extrusion molding material.

In the extrusion molding material of the present invention, various additives such as inorganic fillers, organic fillers, antioxidants, heat stabilizers, light stabilizers, flame retardants, lubricants, anti-static agents, preservatives, fluorescent agents, surface smoothing agents, surface improving agents, releasing agents and the like can be added in small amount which does not disturb the object of the present invention.

The extrusion molded article of the present invention is obtained by extrusion-molding the above-described extrusion molding material. The form of the extrusion molding material is not particularly restricted, and a film is preferable. The thickness of a film can be appropriately selected depending on uses, and usually from about 10 to 500 μm.

The extrusion molded article of the present invention can be prepared by shaping the above-described extrusion molded material into desired form by usual extrusion molding. Specifically, in the case of film-molding, there are listed a casting method in which a molten resin is extruded into given width and thickness through a flat die called T-die, and then cooled to obtain a film, a winding method in which after extrusion, the extruded resin is wound along the film-forming direction and the vertical direction sequentially, an blow molding method in which a resin is extruded in the form of cylinder through an annular die, and wound along the winding direction and the vertical direction simultaneously using a gas, and the like, and in the case of a liquid crystalline polymer, the blow molding method is preferable since anisotropy can be controlled easily.

Further, in the case of blow-molding, a resin can be extruded through an annular die, the resulted cylindrical half-melted resin called parison can be sandwiched by molds, then, expanded by gas pressure, giving form. This method is also suitable method for a liquid crystalline polymer since anisotropy can be controlled easily.

When an extrusion molding material containing the liquid crystalline polyester resin of the present invention is provided in these extrusion molding methods, it can be provided without applying specific design to a usual extrusion molding machine.

EXAMPLES

The following examples further illustrate the present invention in detail below, but do not restrict the scope thereof. In the examples, respective measurements were conducted according the following methods.

(1) Method for Measuring Physical Property (a) Flow beginning temperature: It was measured by a Koka type Flow Tester CFT-500 type manufactured by Shimadzu Corp. Namely, a temperature was measured at which the melt viscosity is 48000 poise when a resin heated at a temperature rising speed of 4° C./min is extruded through a nozzle having an internal diameter of 1 mm and a length of 10 mm at a load of 100 kgf/cm$^2$, and this measured temperature was called flow beginning temperature.

(b) Melt viscosity: It was measured by Capillograph 1B manufactured by Toyo Seiki Seisaku-sho, Ltd. under given temperature at a die diameter of 0.5 mm, a shearing speed of 100/sec or 1000/sec.

(c) Melt tension: Capillograph 1B manufactured by Toyo Seiki Seisaku-sho, Ltd. was used, a resin was melted in a dice having a length of 8.0 mm and a diameter φ of 2.1 mm set at a given temperature 30° C. higher than the flow beginning temperature of each resin, and this resin was extruded at a piston speed of 2 mm/min, then, after passing through a tension pulley, drawn by a drawing apparatus while increasing the drawing speed, and a force loaded on the tension pulley when the extruded filament was broken was measured and expressed in terms of gram.

(d) Intrinsic viscosity: A liquid crystalline polyester resin was dissolved in 3,5-bistrifluoromethylphenol, and the intrinsic viscosity was measured at 60° C. using Ubbelohde viscometer.

(e) Deflection temperature under load (DTUL): A DTUL specimen (127 mm length×12.7 width×6.4 thickness) was molded, and deflection temperature under load was measured at a load of 18.6 kg according to ASTM D648.

(f) Solder heat resistant temperature: A JIS 1 (1/2) dumbbell having a thickness of 1.2 mm was molded as a specimen, and this specimen was immersed into a solder bath composed of 60% of tin and 40% of lead at 230° C., kept at this temperature for 60 seconds, then, taken out of the bath, and the appearance was observed. Subsequently, the temperature of this solder bath was raised step-wise each by 10° C. and the same examination was repeated at each temperature, and the maximum temperature wherein the specimen did not generate bubble or was not deformed was measured.

(2) Film Processing

Resin pellets were melt-kneaded using a twin axial kneading extruder of 20 mm equipped with a cylindrical die manufactured by Toyo Seiki Seisaku-sho, Ltd. at a cylinder setting temperature of 290 to 370° C. and a rotation of 80 rpm, and the molten resin was extruded to upper-ward through a cylindrical die having a diameter of 30 mm, a lip interval of 1.5 mm and a die setting temperature of 290 to 370° C., and a dry air was compressed into the hollow part of this cylindrical film to expand the cylindrical film, then cooled before being wound through a nip roll at a speed of 8 to 15 m/min, to obtain a liquid crystal polymer film having a thickness of 10 to 30 μm. The resulted film was observed visually, and evaluated according to the following criteria.

○: Film-forming is possible, and appearance is also excellent.

Δ: Film-forming is possible, but unevenness in color is recognized.

X: Film-forming is impossible.

(3) Film Heat Resistance

A film having a thickness of about 30 μm obtained as described above was cut into 10 cm square, both ends thereof were fixed by clips and left in a hot air circulation oven set at 280° C. for 5 minutes, then, the film condition was observed, and evaluated according to the following criteria.

○: No change is observed in film form.

X: Film is deformed or melted.

Example 1

10.8 kg (60 mol) of p-acetoxybenzoic acid, 2.49 kg (15 mol) of terephthalic acid, 0.83 kg (5 mol) of isophthalic acid and 5.45 kg (20.2 mol) of 4,4'-diacetoxydiphenyl were charged into a polymerization vessel having comb-like stirring blades, heated under nitrogen gas atmosphere while stirring, and allowed topolymerize at 330° C. for 1 hour. The polymerization was conducted with strong stirring while removing acetic acid by-produced. Then, the system was cooled gradually, and a polymer obtained at 200° C. was taken out of the system. This resulted polymer was ground by a hammer mill manufactured by Hosokawa Micron Corp. to obtain a particle of 2.5 mm or smaller.

This was further treated at 290° C. for 3 hours in a rotary kiln to obtain a wholly aromatic liquid crystalline polyester resin which has a flow beginning temperature of 341° C. and is composed of the following units.

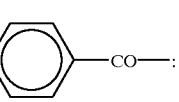

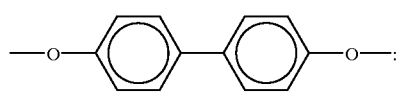

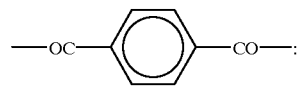

= 60:20:15:5 (molar ratio)

This liquid crystalline polyester resin was granulated at 350° C. using PCM-30 type granulator manufactured by Ikegai Tekko Co., Ltd. to obtain pellets. The flow beginning temperature measured using the pellets was 332° C., and the intrinsic viscosity [η] was 6.8. The melt viscosity, melt viscosity ratio, melt tension and solder heat resistance of this resin and film form and heat resistance in blown film-forming are shown in Tables 1 and 2.

Comparative Example 1

A particle of 2.5 mm or smaller was obtained in the same manner as in Example 1, then, it was treated in a rotary kiln under nitrogen atmosphere at 280° C. for 3 hours to obtain a wholly aromatic liquid crystalline polyester resin which has a flow beginning temperature of 331° C. This liquid crystalline polyester resin was granulated at 340° C. using PCM-30 type granulator manufactured by Ikegai Co., Ltd. to obtain pellets. The flow beginning temperature measured using the pellets was 324° C., and the intrinsic viscosity [η] was 4.8. The melt viscosity, melt viscosity ratio, melt tension and solder heat resistance of this resin and film form and heat resistance in blown film-forming are shown in Tables 1 and 2.

Comparative Example 2

16.6 kg (12.1 mol) of p-hydroxybenzoic acid, 8.4 kg (4.5 mol) of 6-hydroxy-2-naphtoic acid and 18.6 kg (18.2 mol) of acetic anhydride were charged into a polymerization vessel having comb-like stirring blades, heated under nitrogen gas atmosphere while stirring, and allowed to polymerize at 320° C. for 1 hour and allowed to polymerize under a reduced pressure of 2.0 Torr at 320° C. for 1 hour. Acetic acid by-produced during this procedure was distilled out of the system continuously. Then, the system was cooled gradually, and a polymer obtained at 180° C. was ground in the same manner as in Example 1, then, treated at 240° C. under nitrogen gas atmosphere for 5 hours in a rotary kiln to obtain a wholly aromatic liquid crystalline polyester resin which has a flow beginning temperature of 270° C. and is composed of the following repeating units.

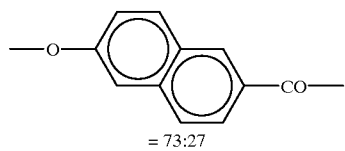

= 73:27

This liquid crystalline polyester resin was granulated at 280° C. using PCM-30 type granulator manufactured by Ikegai Co., Ltd. to obtain pellets. The flow beginning temperature measured using the pellets was 268° C. The melt viscosity, melt viscosity ratio, melt tension and solder heat resistance of this resin and film form and heat resistance in blown film-forming are shown in Tables 1 and 2.

TABLE 1

| | Melt viscosity (poise) | | | | | |
|---|---|---|---|---|---|---|
| | Flow beginning temperature | | Flow beginning temperature + 20° C. | | Melt viscosity ratio | |
| | 100 sec$^{-1}$ | 1000 sec$^{-1}$ | 100 sec$^{-1}$ | 1000 sec$^{-1}$ | 100 sec$^{-1}$ | 1000 sec$^{-1}$ |
| Example 1 | 46700 | 9500 | 4400 | 1400 | 0.09 | 0.15 |
| Comparative Example 1 | 48000 | 8200 | 3000 | 700 | 0.06 | 0.09 |
| Comparative Example 2 | 56000 | 9200 | 4900 | 1500 | 0.09 | 0.16 |

TABLE 2

| | Melt tension (g) | Solder heat resistance (° C.) | DTUL (° C.) | Film appearance | Film heat resistance |
|---|---|---|---|---|---|
| Example 1 | 25 | 290 | 245 | ○ | ○ |
| Comparative example 1 | 2 | 290 | 250 | x | — |
| Comparative example 2 | 3 | 230 | 220 | Δ | x |

The liquid crystalline polyester resin for extrusion molding has high heat resistance and suitable flowability, therefore, useful as an extrusion molding material. In addition, since the extrusion molding material of the present invention contains the above-described liquid crystalline polyester resin, it has excellent heat resistance, and can provide an extrusion molded article, especially a film having excellent appearance, and use in wide variety of fields can be expected.

What is claimed is:

1. A liquid crystalline polyester resin for extrusion molding having a solder heat resistant temperature of 250° C. or more, wherein the ratio ((viscosity 2b)/(viscosity 1b)) of the melt viscosity (viscosity 1b) under a shearing speed of 1000/sec at the flow beginning temperature and the melt viscosity (viscosity 2b) under the same shearing speed at a temperature 20° C. higher than the flow beginning temperature is from 0.10 to 0.70.

2. The liquid crystalline polyester resin for extrusion molding according to claim 1 wherein the melt tension measured at a temperature 30° C. higher than the flow beginning temperature is 10 g or more.

3. The liquid crystalline polyester resin for extrusion molding according to claim 1 or 2 wherein the resin comprises two or more of constituent units represented by the formulae (1) to (4) and the total amount of these combined constituent units is 97 mol % or more based on the whole amount:

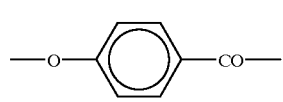

(1)

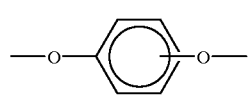

(2)

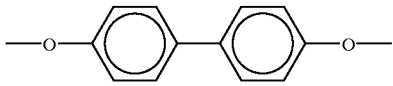

(3)

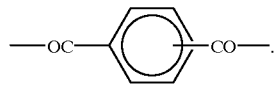

(4)

4. The liquid crystalline polyester resin for extrusion molding according to claim 1 or 2 wherein the resin satisfies all of the following (a) to (c):

(a): the proportion of the constituent unit represented by the formula (1) is from 40 to 70 mol % based on the whole amount, (b) the total amount of the constituent unit represented by the formula (2) and the constituent unit represented by the formula (3) is from 15 to 30 mol % based on the whole amount, and the proportion of the constituent unit represented by the formula (2) is from 0 to 95 mol % based on the total amount of the constituent unit represented by the formula (2) and the constituent unit represented by the formula (3), and 80 to 100 mol % of the constituent unit represented by the formula (2) is composed of constituent components in which the main chain is situated at para-position, (c) the proportion of the constituent unit represented by the formula (4) is equivalent to the proportion of the total amount of the constituent unit represented by the formula (2) and the constituent unit represented by the formula (3), and 50 mol % or more of the constituent unit represented by the formula (4) is composed of constituent components in which the main chain is situated at para-position:

(1)

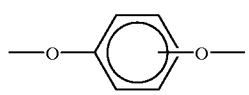

(2)

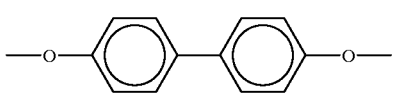

(3)

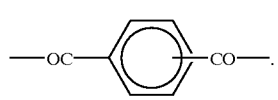

(4)

5. An extrusion molding material wherein the material comprises a resin component, and said resin is composed of the liquid crystalline polyester resin for extrusion molding according to claim 1.

6. An extrusion molded article obtained by extrusion-molding the extrusion molding material according to claim 5.

7. The extrusion molded article according to claim 6, wherein the article is in the form of a film.

* * * * *